Figure 1:
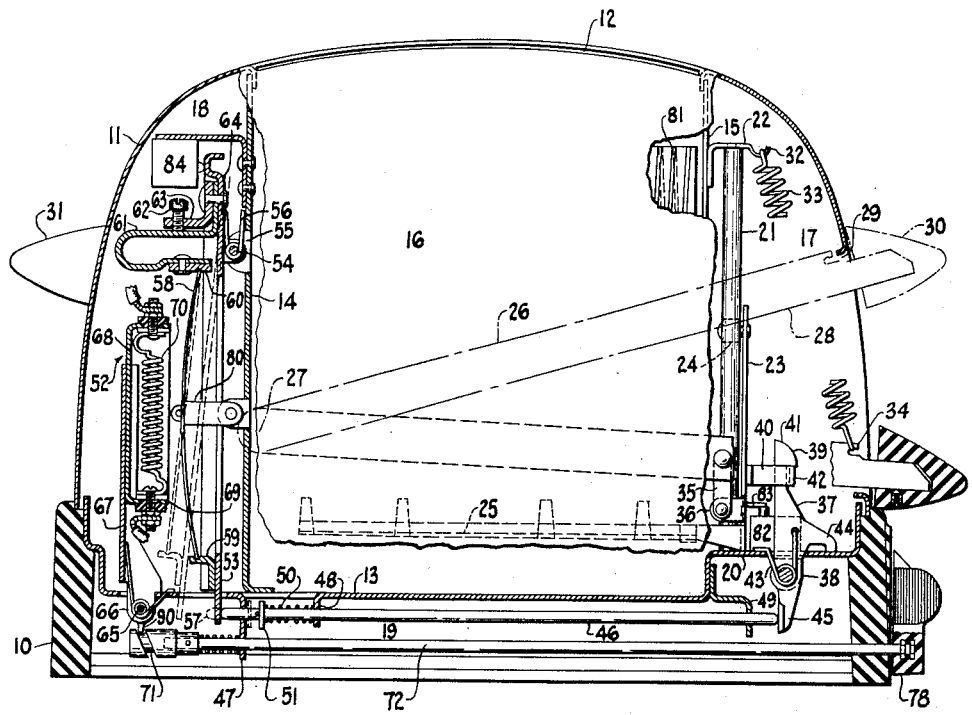

May 20, 1952 E. L. SNYDER ET AL 2,597,827

ELECTRIC TOASTER

Filed Jan. 31, 1947

INVENTORS
Eugene L. Snyder &
Warren A. Humphrey
BY
Harry S. Ducasse
ATTORNEY.

Patented May 20, 1952

2,597,827

UNITED STATES PATENT OFFICE 2,597,827

ELECTRIC TOASTER

Eugene L. Snyder and Warren A. Humphrey, Canton, Ohio, assignors to The Hoover Company, North Canton, Ohio, a corporation of Ohio Application January 31, 1947, Serial No. 725,556

9 Claims. (Cl. 99—329)

The present invention relates to electric bread toasters and more particularly to a thermal timing mechanism for timing the duration of the toasting interval whereby the operator may obtain toast cooked exactly as he or she desires.

In the past it has been usual practice to time the toasting operation by a clockwork mechanism. Clockwork timers have the defect that the toasting time is fixed and accordingly the bread is progressively toasted more and more for each succeeding toasting operation because the toaster itself is hotter for each succeeding toasting operation especially when the succeeding operations follow each other in rapid succession.

An attempt has been made to overcome this difficulty by providing a compensating thermostat to speed up the operation of the clockwork mechanism as the ambient toaster temperature rises for each succeeding toasting operation.

Such timers have been somewhat unsatisfactory because of their complexity, their noisiness and of their unreliableness in operation.

As a result thermal timers have been developed. Thermal timers are inherently self-compensating in that the timer as a whole also becomes progressively hotter for each succeeding toasting operation and accordingly shortens the toasting period for each succeeding operation.

It has been found, however, that thermal timers have a tendency to over-compensate. That is, for each succeeding toasting operation, the toast is cooked progressively less and less for any particular timer setting.

This result comes about by reason of the fact that heat is stored in the parts of the thermal timer from the preceding toasting operation and as a consequence the timer becomes hotter and hotter at the start of each succeeding toasting operation. This causes the thermally responsive element of the timer to act faster and faster for each succeeding toasting operation.

According to the present invention, the foregoing difficulties have been remedied by providing a thermal timer in which the toasting operation is not terminated until the thermal timing element has cooled to a predetermined temperature. This will always assure that the thermal timing element is at its proper temperature at the beginning of each toasting operation.

According to this invention the thermal timing element is heated and then cooled to perform the timing function. An auxiliary heater is provided for the thermal element which is energized simultaneously with the main heaters. When the thermal element reaches a predetermined temperature it acts to deenergize the auxiliary heater while the main heaters remain energized. The thermally responsive element is then permitted to cool and when it reaches a predetermined lower temperature it operates to deenergize the main heaters and release the toast carriage for upward movement to toast ejecting position.

In order to adjust for light, medium or dark toast, the auxiliary heater is movable toward and away from the thermally responsive element so as to vary the time it takes the thermally responsive element to reach its predetermined high temperature. The time it takes the thermally responsive element to cool from its predetermined high temperature to its predetermined low temperature will remain substantially the same regardless of the setting of the adjusting mechanism. Thus the toasting interval is varied solely by varying the heating up period of the thermally responsive element.

A reflector is provided for reflecting heat from the auxiliary heater to the thermally responsive element which moves toward and away from the thermally responsive element with the auxiliary heater as the auxiliary heater is moved toward and away from the thermally responsive element in adjusting the timer for light, medium or dark toast.

Another important feature of this invention is the construction of the thermal timer itself. According to this invention the thermal timer includes a bimetallic strip supported at its ends on a pivoted member so that movement of the bimetal imparts movement to the pivoted member in one direction to actuate a switch for the auxiliary heater and in the reverse direction to deenergize the main heaters and to release the toast carriage.

A compressive force is applied to the ends of the bimetallic strip so as to normally hold the strip in one of its two opposed positions. At its mid point the bimetallic strip is secured to a fixed support by a link so that the mid point of the bimetallic strip remains substantially stationary. As a consequence, when the bimetallic strip is heated or cooled, the ends of the strip move laterally relative to the center so as to cause the pivoted member to move from one position to the other. Regardless of whether the bimetallic strip is being heated or cooled it will eventually reach a dead center position and then snap quickly to its opposite bowed position and move the pivoted member with a snap action. This snap action is utilized in applying a hammer blow to the release mechanism when the bimetallic strip snaps to its cold position.

The bimetallic strip is mounted between two supports or projections positioned in spaced relationship on the pivoted element. One of the supports includes a compensating bimetal of U-shape which applies a greater compressive force on the ends of the bimetallic strip as the ambient temperature of the toaster rises. A factory adjustment is also provided for adjusting the position of the compensating bimetal and thus adjust the initial compressive force applied to the ends of the main bimetallic strip.

According to another feature of this invention the bread carriers are latched in toasting position by a latch which is spring-biased to latching position. A reciprocating actuating member is provided for actuating the latch which actuating member is normally spring-biased away from said latch so that it will move away therefrom into spaced relationship thereto when permitted to do so. A snap acting timing mechanism is provided having two positions of stability, in one of which the actuating member is held against said latch but with insufficient force to release the latch against the force of its spring-bias. When the snap acting mechanism moves to its opposite position of stability the reciprocating actuating mechanism member moves away from the latch. The snap acting timer is then caused to move back to its original position with a snap action so as to impart an impact to the reciprocating actuating member of sufficient force to overcome the spring-bias of the latch and thus release the latch.

According to another feature of this invention partitions are provided dividing the toaster into a central toasting chamber, front and rear mechanism compartments and a bottom mechanism compartment. A latch is provided in the front mechanism compartment for holding the carriage in toasting position. A thermal timer is positioned in the rear mechanism compartment for timing the duration of the toasting interval and a motion transmitting member is positioned in the bottom compartment for transmitting motion from the timer to the latch for releasing the same.

During operation, except for the initial toasting operation, the thermal element is never cooled to its initial cold position at the end of any timing operation. However, on the initial toasting operation, when the toaster is in a cold condition or state, it takes some time for the toaster itself to come up to toasting temperature. According to this invention the thermal mass of the toaster itself is so correlated with that of the timer that on the initial toasting operation, when the toaster is in a completely cold state, the toaster will have reached its toasting temperature about the same time as the thermal element has reached a temperature approximately the same as it has when it terminates a toasting operation.

Figure 2:
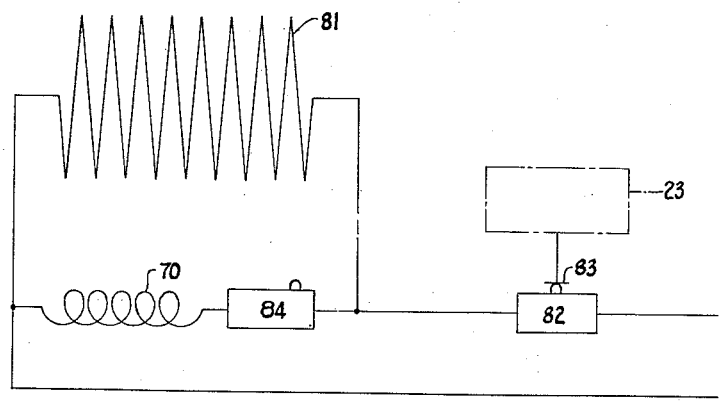

Other objects and advantages of this invention will become apparent as the description proceeds or taken in connection with the accompanying drawings in which:

Figure 1 is a cross sectional view of a toaster showing the timing mechanism according to this invention applied thereto, and Figure 2 is a wiring diagram of a toaster constructed according to this invention.

Referring to the drawings, the toaster is provided with a plastic base 10 with a cover or appearance housing 11 mounted thereon to cover the mechanism and toasting compartments. The appearance housing 11 is provided with two toast receiving openings 12, one of which is shown in Figure 1.

A base plate 13 is mounted on the base 10 and forms a support for the entire mechanism within the appearance housing 11.

Partitions 14 and 15 divide the toaster into a toasting chamber 16, front mechanism compartment 17 and rear mechanism compartment 18. The base plate 13 separates the toasting chamber 16 from a lower mechanism compartment 19.

Rigidly mounted upon an upwardly extending portion 20 of the base plate 13 are a pair of guide posts 21, one of which is shown in Figure 1 which is rigidly attached to the partition 15 by means of a bracket 22. The guide posts 21 form guides for a vertically reciprocating supporting plate 23 by means of a plurality of rollers as is well known in the art, one of which is shown at 24.

Rigidly attached to the bottom end of the supporting plate 23 are a pair of bread carriers 25, one of which is shown in Figure 1. In order to manually reciprocate the supporting plate 23 and bread carriers 25 in an upward and downward direction, a U-shaped lever is provided, one arm 26 of which is shown in Figure 1. At their rear ends the arms 26 are pivoted to the toasting chamber walls as shown at 27 and at their front ends are extended forwardly as at 28 so as to extend through the slot 29 in the appearance housing 11. Secured to the extending portions 28 of the arms 26 is a manipulating handle 30 by which the toast carriers 25 may be moved downwardly to toasting position. At the opposite end of the toaster from the manipulating handle 30 is a second handle 31 secured to the appearance housing 11. When the toast carriers are in upward position the handles 30 and 31 may be utilized for carrying the toaster from place to place.

The bracket 22 is extended forwardly to form a hook 32 which forms the upper anchorage for a tension spring 33 which is secured at its lower end to a hook 34 on the extending portions 28 of the arms 26. The arms 26 are secured to the supporting plate 23 by means of links 35 pivoted at their upper ends to the arms 26 and at their lower ends to lugs 36 which are bent backwardly from the supporting plate 23.

Normally the tension spring 33 spring-biases the arms 26 to their upward position and accordingly also spring-biases the bread carriers 25 and the supporting plate 23 to their upward position.

In order to hold the bread carriers 25 in their lower toasting position a latch 37 is pivoted to lugs 38 struck downwardly from the portion 20 of the base plate 13. At its upper end the latch 37 has a hook 39 which cooperates with a U-shaped member 40 extending forwardly from the supporting plate 23 to hold the supporting plate 23 in downward position. The latch is provided with a cam surface 41 which cooperates with the portion 42 of the lug 40 to move the latch 37 counter-clockwise against the bias of the spring 43 when the supporting plate 23 is moved to downward position. When the hook 39 passes the portion 42 of the lug 40 the spring 43 projects the hook 39 above the portion 42 of the lug 40. In order to hold the latch 32 in a position so that the cam surface 41 will cooperate with the lug 42, a stop 44 is provided which coacts with the plate 20 to hold the latch 37 in a substantially vertical position.

Below its pivot the latch 37 is provided with an impact end 45 which cooperates with a reciprocating rod 46 mounted upon the bottom plate 13 by means of lugs 47, 48 and 49 so as to lie in the bottom mechanism compartment 19. A spring 50 coacts with the collar 51 and the projection 48 to normally spring-bias the actuating rod 46 toward the left so as to be out-of-contact with the impact end 45 of the latch 37 unless positively held in that position.

The timing mechanism generally indicated by the reference numeral 52, comprises a frame 53 pivotally mounted at 54 upon lugs 55 struck rearwardly from the partition 14. A spring 56 biases the frame 53 so that its impact end 57 presses against the rod 46 to hold the front end of rod 46 against the impact end 45 of latch 37 in opposition to the bias of the spring 50 but with insufficient force to overcome the force of the spring 43 and the frictional force holding the latch 37 in latching position.

A bimetallic strip 58 is supported at its ends between an abutment 59 at the lower end of the frame 53 and an abutment 60 near its pivot point 54. The abutment 60 is mounted on the end of a U-shaped bimetallic strip 61 secured to the frame 53 by a rivet or other suitable securing means. A screw 62 is threaded through a bracket 63 secured to the upper end 64 of the frame 53 and is adapted to be adjusted to apply more or less pressure to the end of the bimetallic strip 58 and constitutes a factory adjustment. The purpose of the U-shaped bimetal strip 61 will be described in more detail hereinafter.

The central portion of the bimetallic strip 58 is secured to the partition 14 by means of a link 80 so that the central portion of the bimetallic strip is substantially immovable relative to the pivot point 54 of the frame 53.

Pivotally mounted at 65 on lugs 66 struck downwardly from the base plate 13 is a bracket 67 which carries a reflector 68. The ends of the reflector 68 are turned forwardly as shown at 69 and support an auxiliary heating coil 70. The bracket 67, reflector 68 and the heating coil 70 normally lie in substantially parallel relationship to the bimetallic strip 58 and are adapted to be moved toward and away from the bimetallic strip 58 by means of a spiral cam 71 cooperating with the lug 90 on the bracket 67. The cam 71 is mounted on the end of a rod 72 extending through the lower mechanism chamber 19 and through the base 10. The rod 72 is supported by lug 47 and by an opening extending through the front of base 10. On the outside of the base 10 a manipulating knob 78 is attached to the rod 72 for manual rotation thereof.

Main heating elements 81 are spaced on each side of the toast racks 25 within the toasting chamber 16. The main switch 82 is closed by lug 83 struck outwardly from the support 23 when the support 23 and the carriers 25 are moved to toasting position so as to energize the main heaters 81. The switch 82 opens automatically when the lug 83 is raised.

An auxiliary switch 84 is closed to energize the auxiliary heater 70 by the end 64 of the frame 53 when in the position shown in Figure 1. When the end 64 moves to the right or in the clockwise direction as viewed in Figure 1, the switch 84 will open automatically to deenergize the auxiliary heater 70.

Referring to Figure 2 it will be apparent that when the switch 82 is closed by the lug 83 when the carriers 25 are moved to downward position the main heaters 81 will be energized. The auxiliary heater 70 and the switch 84 are in parallel with the main heaters 81 and if the switch 84 is closed the auxiliary heater 70 will also be energized by movement of the toast carriers to downward position.

Operation

Assume that the operator desires dark toast and that the toaster is cold. The knob 78 will be manipulated clockwise so as to move the auxiliary heater 70 and the reflector 68 to a position farthest away from the bimetallic strip 58 so that less heat will be radiated from the auxiliary heater 70 to the bimetallic strip 58.

At this time the bread carriers will be held in their upper bread receiving position by the spring 33. Bread slices will be inserted through the openings 12 so as to rest on the carriers 25. The handle 30 will then be grasped and moved to lowermost position which will move the bread carriers to toasting position. The cam surface 41 on the latch 37 will be contacted by the portion 42 of the loop 40 carried by the support 23 which will cause the latch 37 to move to counter-clockwise position, as viewed in Figure 1, against the bias of its spring 43. When the part 42 passes the edge of the hook 39 the latch will snap to the position shown in Figure 1 under the bias of spring 43 so that the hook 39 will overlie the part 42 and latch the carriers in toasting position.

At this time the bimetallic strip 58 will be cold and bowed away from the frame 53, as shown by full lines of Figure 1, so as to permit the spring 56 to hold the frame 53 against the end of the rod 46 and press the rod against the end 45 of the latch 37 in opposition to the bias of the spring 50. The end 64 of the lever 53 will also be operable to close the switch 84.

Movement of the carriers 25 to toasting position will cause the lug 83 on the support 23 to close the switch 82 which accordingly will simultaneously energize the main heaters 81 and the auxiliary heater 70.

At this time the entire toaster is cold as is the timer 52. The heat from the heaters 81 and the auxiliary heater 70 will gradually increase the temperature of the toaster as a whole as well as the temperature of the timer 52 until the toasting chambers 16 reach a toasting temperature and the toasting operation will begin. Heat which is radiated directly from the heater 70 to the bimetallic strip 58 and also reflected thereto by the reflector 68 will gradually increase the temperature of the bimetallic strip 58 so that it will tend to straighten. Since the central portion of the strip 58 is substantially fixed by the link 80 relative to the pivot 54, the straightening of the bimetallic strip 58 will cause the frame 53 to move gradually in a clockwise direction as viewed in Figure 1. This will cause its impact end 57 to move to the left and will also permit the rod 46 to move to the left under the bias of spring 50 until the bimetallic strip assumes a substantially straight position when it will snap the frame 53 across its dead center position to the dotted line position shown in Figure 1 which will move the impact end 57 of frame 53 out of contact with the end of the rod 46.

Since the bimetallic strip 61 was also cold at the start of this toasting operation it will apply a small compressive force to the end of the bimetallic strip 58 so that less heat will be necessary to move the bimetallic strip 58 past its dead center position than would be the case if the entire timer was warm at the start of the toasting period.

Movement of the frame 53 past its dead center position to the position shown in dotted lines of Figure 1 will cause the end 64 to move away from the switch 84 so that the switch 84 automatically opens and deenergizes the auxiliary heater 70 so as to permit the bimetallic strip 58 to cool.

As the bimetallic strip 58 cools it will again tend to straighten from the dotted line position shown in Figure 1 so as to move the frame 53 in a counter-clockwise direction. This will continue until the frame 53 moves back to its dead center position at which time the combined action of the bimetallic strip 58 and the spring 56 will quickly snap the frame 53 to its full line position shown in Figure 1. This will cause the impact end 57 to contact the end of the rod 46 with a sort of hammer blow forcing the rod to the right. The right hand end of rod 46 will contact the impact end 45 of the latch 37 also with a hammer blow of sufficient force to move the latch 37 in a counter-clockwise direction as viewed in Figure 1 and move the hook 39 away from above the portion 42 of the lug 40. This will permit the spring 33 to move the support 23 and the carriers 25 to their uppermost position. This will cause the lug 83 to move out of contact with the switch 82 which switch will automatically open and deenergize the main heaters 81 to end the toasting interval.

When the portion 42 of the lug 40 clears the hook 39 of the latch 37 the spring 43 will move the latch 37 in a clockwise direction as viewed in Figure 1 to the position shown in Figure 1 where the stop 44 is in contact with the end 20 of the plate 13. The rod 46 will move to the left under the bias of spring 50 and accordingly move the frame 53 slightly to the left to the position shown in Figure 1 against the force of the spring 56 placing the mechanism in condition for the next succeeding toasting operation.

Since the bimetallic strip 58 was cooled to a predetermined low temperature before the toasting period was ended it will be in a fairly cool condition ready for the next succeeding toasting operation. It has been found that thermal timers have a tendency to over-compensate due to the heat stored in them but since the bimetallic strip 61 is also hotter than when the toaster is operated from cold position it will apply more compressive force to the end of the bimetallic strip 58 so that more heat must be supplied to the bimetallic strip 58 to cause the frame 53 to pass its dead center position than is the case when the toaster is operated from its cold position.

If now the operator desires a second cooking operation, bread slices are again inserted through the opening 12 as before and the manipulating knob 30 moved to downward position. The device will operate as before except that in this case the toasting chambers are substantially at toasting temperature, and immediately the main switch 82 is closed, the toasting operation will begin. Since the bimetallic strip 58, the auxiliary heater 70, and the reflector 68 are also hotter than when the toaster was initially operated, it will take less time for the bimetallic strip to move past its dead center position to the dotted line position of Figure 1 so as to deenergize the auxiliary heater 70. Thus the time for heating up the bimetallic strip to a predetermined high temperature will be less for the second operation than for the first, but the time for its movement from the dotted line position of Figure 1 to the full line position of Figure 1 will be substantially the same as before. Thus, the only variant is the time it takes to heat up the bimetallic strip 58 so that it will snap to its dotted line position of Figure 1.

If the operator desires lighter toast he moves the manipulating knob 78 counter-clockwise so as to move the frame 67, reflector 68 and auxiliary heater 70 toward the bimetallic strip 58 so as to decrease the time it takes to heat the bimetallic strip 58 to its predetermined high temperature. Again the only variant in adjusting for light, medium or dark toast is the time it takes to heat the bimetallic strip 58 from its cold to its hot position since the time it takes the bimetallic strip 58 to cool is substantially the same for all adjustments of the manipulating knob 78.

From the foregoing it can be seen that this invention provides a toaster and timer in which the operator can obtain toast of any degree of brownness by merely manipulating a manual knob to move the auxiliary heater and its reflector toward and away from the thermally responsive element to vary the time of the toasting period. In addition, the toaster is always reliable in operation because the bimetallic element is always in a properly cooled condition at the initiation of any particular toasting operation and movement of the timer to its terminating position imparts an impact or hammer blow to the latch so that the latch is always positively released to terminate the toasting operation.

While we have shown but a single embodiment of our invention it is to be understood that this embodiment is to be taken as illustrative only and not in a limiting sense. We do not wish to be limited to the particular structures shown and described but to include all equivalent variations thereof except as limited by the scope of the claims.

We claim:

1. A toaster comprising; bread carriers spring-biased to bread receiving position; a latch cooperating with said carriers and operable to latch them in toasting position; said latch being spring-biased to latching position; a reciprocable actuating rod movable in one direction to release said latch and being spring-biased in the opposite direction; a snap-acting pivoted thermal timer including a bimetallic strip movable from one bowed stable position to another upon being heated and back to its first position upon cooling; said timer being biased by the action of said bimetallic strip hold said actuating rod against said latch in a direction tending to release said latch when said strip is cold, to snap in its opposite bowed position when said strip is hot and allow said rod to move away from said latch and to snap back to its original position when cooled to forcibly press said rod against said latch to release the same; means actuated by movement of said carriers to toasting position for heating said strip and means actuated by movement of said timer away from said latch for discontinuing the heating of said strip.

2. In a thermal timer, a frame, a pivotal mounting for said frame adjacent one end thereof, a pair of spaced projections carried by said frame adjacent each end thereof, a bimetallic strip having its end engaging the adjacent faces of said projections so as to normally lie in a bowed position between said projections, means for holding the central portion of said strip against movement whereby a flexing movement of said strip will cause said frame to move about its pivot and means for heating said bimetallic strip.

3. A thermal timer comprising, a frame pivoted to a fixed support intermediate its ends, a lug extending from said frame near one end thereof, a second lug extending from said frame near its pivot point, a bimetal strip supported at its ends by said lugs so as to assume oppositely bowed positions upon being heated or cooled, a link connecting the central portion of said strip to said fixed support so that the central portion of said strip cannot move relative to said pivot, spring means for biasing said frame to a position where said strip is bowed away from said frame, means for heating said strip so that it will flex and snap to a bowed position toward said frame and cause said frame to move about its pivot in one direction, means operable by movement of said frame in said one direction for deenergizing said heating means to permit said strip to cool and assume its original position and move said frame to its original position and means operable by movement of said frame to its original position for actuating a control.

4. A control device comprising, a pivoted member spring-biased to a holding position, a reciprocating actuating member movable in one direction to move said pivoted member to releasing position and being spring-biased in the opposite direction, a pivoted frame spring-biased to a position to hold said reciprocating member against said pivoted member with sufficient force to overcome the spring-bias of said reciprocating member but of a strength insufficient to move said pivoted member against the bias of its spring, a snap-acting bimetal supported by said frame so that when heated it will move said frame away from said reciprocating member and when cooled will snap said frame back to its original position against said reciprocating member with sufficient force to overcome the spring-bias of said pivoted member so as to move said pivoted member to its releasing position and means for heating said bimetal.

5. A thermal timer of the heat-up cool-off type comprising, a snap-acting mechanism including a thermally responsive element and a pivotally mounted frame spaced means on said frame for supporting and applying pressure to the ends of said thermally responsive element and means between the ends thereof and connected to a fixed support for preventing substantial movement of the central portion of said thermally responsive element, the arrangement being such that when said thermally responsive element is cold it will hold said frame in one position of stability and when hot it will hold said frame in an opposite position of stability, a heater positioned to heat said thermally responsive element, means operable to energize said heater by movement of said frame to its first position of stability, said means being operable by movement of said frame to its opposite position of stability for deenergizing said heater to permit said thermally responsive element to cool and move said frame back to its first position of stability and means operated by movement of said frame to its first position of stability for operating a control.

6. A timer comprising, a frame pivoted intermediate its ends to a fixed support so as to form legs lying on each side of said pivot, spaced lugs extending from said frame on one of said legs, a bimetal strip supported in bowed position between said lugs so as to assume a position bowed away from said frame when cold and toward said frame when hot, means for fixing the central portion of said strip relative to said fixed support, means for heating said strip to cause it to flex into a bowed position toward said frame to cause said frame to move about its pivot in one direction, means actuated by movement of said frame to said one position for deenergizing said heater and permitting said strip to cool and assume its first position and move said frame to its first position and means actuated by movement of said frame to its first position for actuating a control.

7. A timer comprising, a frame pivoted intermediate its ends to a fixed support so as to form legs extending on opposite sides of said pivot, spaced lugs extending from said frame upon one of said legs, a bimetal strip supported in bowed position between said lugs so as to assume a position bowed away from said frame when cold and toward said frame when hot, means for fixing the central portion of said strip relative to said fixed support, means for heating said bimetal strip to cause it to flex into a bowed position toward said frame and cause said frame to move about its pivot in one direction, means actuated by movement of said frame to said one position for deenergizing said heater and permit said strip to cool and assume its first position, one of said lugs comprising a compensating bimetal so arranged as to apply a greater stress to the end of said bimetal strip as the temperature of the timer rises and means actuated by movement of said frame to its first position for actuating a control.

8. A timer comprising, a bimetallic thermally responsive element and a pivotally mounted frame spaced means on said frame for supporting and applying pressure to the ends of said thermally responsive element and means between the ends thereof and connected to a fixed support for preventing substantial movement of the central portion of said thermally responsive element, the arrangement being such that said bimetal will assume a position bowed away from said frame when cold and a position bowed toward said frame when heated and will snap said frame about its pivot from one position of stability to another position of stability when said bimetal is heated and back to its first position of stability when said bimetal is cooled, and a heater and reflector lying in spaced parallel relationship to said bimetal with said heater lying between said reflector and bimetal so that said reflector directs heat from said heater to said bimetal, said frame and bimetal being movable toward and away from said heater and reflector during timing periods.

9. A timer comprising, a pivotally mounted frame, a bimetallic thermally responsive strip associated with said frame, spaced means on said frame for supporting and applying pressure to the ends of said thermally responsive strip and means between the ends thereof and connected to a fixed support for preventing substantial movement of the central portion of said thermally responsive strip, the arrangement being such that when said strip is heated said frame will pivotally snap from one position of stability to another position of stability and when it is cooled it will snap back to its first position, a second frame lying in spaced parallel relationship to said first mentioned frame, a reflector carried by said second frame so as to lie in spaced parallel relationship with said strip, a heater lying between said reflector and strip so that heat radiated by said heater is directed to said strip, said frame and bimetallic strip being movable toward and away from said heater and reflector during timing periods, means for energizing said heater with said frame in its first position to cause said strip to flex and snap said first mentioned frame to its second position, means actuated by movement of said frame to its second position for deenergizing said heater to permit said strip to cool and snap said first mentioned frame to its first position, and means actuated by movement of said first frame to its original position for operating a control.

EUGENE L. SNYDER.
    WARREN A. HUMPHREY.

REFERENCES CITED

The following references are of record in the file of this patent:

UNITED STATES PATENTS

| Number | Name | Date |
|---|---|---|
| 1,586,738 | Guy Pell | June 1, 1926 |
| 1,836,192 | Schoenberg et al. | Dec. 15, 1931 |
| 2,145,722 | Hall | Jan. 31, 1939 |
| 2,196,393 | Ireland | Apr. 9, 1940 |
| 2,196,394 | Ireland | Apr. 9, 1940 |
| 2,250,439 | Persons | July 22, 1941 |
| 2,271,485 | Koci | Jan. 27, 1942 |
| 2,271,520 | Strauss | Feb. 3, 1942 |
| 2,284,450 | Sardeson | May 26, 1942 |
| 2,285,720 | Joy | June 9, 1942 |
| 2,302,117 | Gomersall | Nov. 17, 1942 |
| 2,303,561 | Koci | Dec. 1, 1942 |
| 2,337,098 | Gomersall | Dec. 21, 1943 |
| 2,347,385 | Wright et al. | Apr. 25, 1944 |
| 2,426,620 | Koci | Sept. 2, 1947 |
| 2,436,735 | Walder et al. | Feb. 24, 1948 |
| 2,508,464 | McCullough | May 23, 1950 |

FOREIGN PATENTS

| Number | Country | Date |
|---|---|---|
| 519,684 | Great Britain | Apr. 3, 1940 |